United States Patent
Turner et al.

(10) Patent No.: US 6,847,192 B2
(45) Date of Patent: Jan. 25, 2005

(54) POWER SUPPLY FOR AN ELECTRICAL LOAD

(75) Inventors: Geoffrey Alan Turner, New South Wales (AU); Sarkis Keshishian, New South Wales (AU); George Lange Paul, New South Wales (AU)

(73) Assignee: Energy Storage Systems Pty Ltd, Lane Cover (AU)

( * ) Notice: Subject to any disclaimer, the term of this patent is extended or adjusted under 35 U.S.C. 154(b) by 0 days.

(21) Appl. No.: 10/276,407

(22) PCT Filed: May 15, 2001

(86) PCT No.: PCT/AU01/00554
§ 371 (c)(1),
(2), (4) Date: May 1, 2003

(87) PCT Pub. No.: WO01/89055
PCT Pub. Date: Nov. 22, 2001

(65) Prior Publication Data
US 2003/0169022 A1 Sep. 11, 2003

(30) Foreign Application Priority Data
May 15, 2000 (AU) ............................................. PQ7505

(51) Int. Cl.$^7$ ............................................. H01M 10/46
(52) U.S. Cl. ..................................................... 320/166
(58) Field of Search ................................ 320/103, 107, 320/117, 138, 166; 307/64, 65, 66

(56) References Cited

U.S. PATENT DOCUMENTS

| | | | |
|---|---|---|---|
| 5,532,572 A | * 7/1996 | Okamura ..................... | 320/166 |
| 5,591,212 A | 1/1997 | Keimel | |
| 5,761,045 A | 6/1998 | Olson et al. | |
| 5,821,006 A | * 10/1998 | Patel et al. ..................... | 429/3 |
| 5,832,282 A | 11/1998 | Pate et al. | |
| 5,905,371 A | * 5/1999 | Limpaecher ................. | 323/288 |
| 6,061,577 A | 5/2000 | Andrieu et al. | |
| 6,087,812 A | * 7/2000 | Thomas et al. .............. | 320/141 |

FOREIGN PATENT DOCUMENTS

WO    WO 98/34314    8/1998

OTHER PUBLICATIONS

Australia Patent Office, International–Type Search Report, National Application No. PQ7505, filed May 15, 2000.
Patent Abstracts of Japan, vol. 1996, No. 02, Feb. 29, 1996 & JP 07 271681 Oct. 20, 1995.
Patent Abstracts of Japan, vol. 018, No. 060, Jan. 31, 1994 & JP 05 276679, Oct. 22, 1993.
Low K S et al.: *Supervisor ICs monitor battery–powered equipment*, Microprocessors and Microsystems, IPC Business Press Ltd. London, GB, vol. 20, No. 7, Mar. 17, 1997.
Cahela D R et al.: *Overview of Electrochemical Double Layer Capacitors*, Proceedings of the Iecon '97: 23$^{rd}$. International Conference on Industrial Electronics, Control, and Instrumentation, New Orleans, Nov. 9–14, 1997, Proceedings of IEEE Iecon: International Conference on Industrial Electronics, Control, and Instrum., vol. 3, Nov. 9, 1997.

\* cited by examiner

*Primary Examiner*—Edward H. Tso
(74) *Attorney, Agent, or Firm*—Kenyon & Kenyon

(57) ABSTRACT

A power supply (1) is for an electrical load in the form of a Notebook computer (2). Power supply (1) includes first terminals (3, 4) which extend from computer (2) for releasably electrically connecting with a first energy storage device in the form of battery (5) during a first interval. A second energy storage device, in the form a second battery (not shown), releaseably electrically connects with terminals (3, 4) during a second interval spaced apart from the first interval. This allows power to be supplied to the load during those intervals. A capacitive energy storage device, designated generally by reference numeral (6), supplies power to the load during a third interval that spans the spacing between the first and the second intervals.

23 Claims, 8 Drawing Sheets

TABLE 1

| Supercapacitor designation | Capacitance (F) | ESR (mΩ) | Voltage (V) | Size: L x W x D (mm) |
|---|---|---|---|---|
| Mk 1 C1 | 50 | 6.8 | 9.2 | 125 x 120 x 10 |
| Mk 1 C2 | 50 | 6.8 | 9.2 | 125 x 120 x 10 |
| Mk 2 | 38 | 2.9 | 9.2 | 130 x 115 x 13 |
| Mk 3 | 36 | 2.4 | 9.2 | 120 x 120 x 12.5 |
| Mk 4 C1 | 14 | 4.9 | 9.2 | 120 x 120 x 10.5 |
| Mk 4 C2 | 14 | 4.6 | 9.2 | 120 x 120 x 10.5 |
| Mk 4 C5 | 14.4 | 4.9 | 9.2 | 120 x 120 x 10.5 |
| Mk 4 C6 | 14. | 5 | 9.2 | 120 x 120 x 10.5 |
| 1-cell, hot swap | 24 | 12 | 2.3 | 75 x 67 x 0.8 |

TABLE 2

| Supercap | Time, minutes | Cap Voltage, V |
|---|---|---|
| C1 M1 | 0 | 6.000 |
| | 1 | 5.690 |
| | 2 | 5.400 |
| | 3 | 5.080 |
| | 4 | 4.770 |
| | 5 | 4.480 |
| | 6 | 4.210 |
| | Shut Off@ 6min 56sec | 4.060 |
| | | |
| C1 M2 | 0 | 6.000 |
| | 1 | 5.590 |
| | 2 | 5.140 |
| | 3 | 4.700 |
| | 4 | 4.320 |
| | Shutoff @ 4min 49sec | 4.050 |
| | | |
| C1 M3 | 0 | 6.000 |
| | 1 | 5.640 |
| | 2 | 5.250 |
| | 3 | 4.860 |
| | 4 | 4.500 |
| | 5 | 4.170 |
| | Shutoff @ 5min 22sec | 4.050 |

TABLE 3

| Supercap | Time, seconds | Cap Voltage, V |
|---|---|---|
| 24F, 12mΩ, "hot swap" | 0 | 2.3 |
|  | 55.5 | 0.8 |

| Voltage | 6.9V | 6.9V |
|---|---|---|
| C | 1.9 F | 2.5 F |
| ESR | 20 mΩ | 15 mΩ |
| Size | 70 mm x 60 mm x 2.8 mm | 70 mm x 60 mm x 3.2 mm |
| Operating Temperature | -20°C to 50°C | -20°C to 50°C |
| Storage temperature | -40°C to 60°C | -40°C to 60°C |
| Absolute Maximum Current | Determined by design of terminals (contact cap-XX for further information.) | Determined by design of terminals (contact cap-XX for further information.) |

TABLE 4

POWER SUPPLY FOR AN ELECTRICAL LOAD

FIELD OF THE INVENTION

The present invention relates to a power supply.

The invention has been developed primarily for portable computers and will be described hereinafter with reference to that application. It will be appreciated, however, that the invention is not limited to that particular field of use and is also suitable for other electronic devices such as palmtop computers, electronic organisers, mobile telephones, devices using bluetooth technology, and the like.

BACKGROUND TO THE INVENTION

A wide variety of portable electronic devices are available for both private and business use and for providing various functionality and utility. It is common in such devices to include volatile memory that must be continually powered to retain its veracity. This, in turn, requires a continuous supply of power to the processor or memory, even when the device is not being used. This is not particularly problematic, as the existing batteries can reasonably efficiently provide a current of the magnitude required. Where the difficulties arise, however, is when the battery needs replacing.

In some devices, this problem has been addressed by utilising a secondary or back-up battery that provides the necessary power to the memory in the interval between the spent primary battery being removed and a fresh primary battery being inserted.

Batteries, however, are expensive and it can be difficult to financially justify the cost of two batteries when one is only used intermittently. This is increasingly so for the larger devices such a portable computers where weight, size and cost considerations are paramount. The result being that such computers do not rely upon a secondary battery and, instead, are shut down between battery swaps with any necessary data being stored on a permanent hard drive rather than in volatile memory.

The major disadvantage that arises from this is that the shutting down of a portable computer, the removal of the spent battery, the replacement with a new battery and the rebooting of the computer consumes considerable energy and takes time, in the order of minutes. The first further limits the effectiveness of the portable power sources while the second is a source of frustration to users.

The discussion within the specification of the prior art is for the purposes of providing an addressee with some context of the field of the invention and is not to be taken as an admission of the extent of the common general knowledge in that field.

DISCLOSURE OF THE INVENTION

It is an object of the invention, at least in the preferred embodiment, to overcome or substantially ameliorate at least one of the disadvantages of the prior art, or at least to provide a useful alternative.

According to a first aspect of the invention there is provided a power supply for an electrical load, the power supply including:

first terminals extending from the load for releaseably electrically connecting with a first energy storage device during a first interval and a second energy storage device during a second interval spaced apart from the first interval for allowing power to be supplied to the load during those intervals; and a capacitive energy storage device for supplying power to the load during a third interval that spans the spacing between the first and the second intervals.

Preferably, the third interval overlaps with one or both of the first and second intervals.

Preferably also, the first and the second energy storage devices are first and second batteries. In other embodiments, however, they are fuel cells. More preferably, the load is a portable computer and the batteries are rechargeable and are the primary source of power for the computer. That is, during the first interval when the first battery is providing power to the load, the second battery is being recharged for providing power to the load in a later second interval. The spacing between the first and second interval is that which is required to effect disconnection of the first battery from the terminals and the subsequent connection of the second battery to the terminals. This "changeover" of the batteries is referred to as swapping, and where that swapping occurs without requiring shut down of the computer, it is referred to as "hot swapping".

In a preferred form the computer includes a run mode which has a first average power consumption and a standby or sleep mode which has a second average power consumption, where the first average is greater than the second average. More preferably, the computer is placed in standby mode during the third interval. More preferably, the computer is responsive to the attempted removal of the battery currently being used to progress into the standby mode. Even more preferably, the computer mechanically obstructs removal of the battery currently being used until the computer is in standby mode.

Preferably, the capacitive energy storage device includes at least one capacitor and preferably a plurality of capacitors connected in parallel or series. More preferably, the capacitor is a supercapacitor. Even more preferably, the supercapacitor is a carbon double layer supercapacitor.

Preferably also, the capacitive device includes a switching device for allowing the capacitor to discharge through the terminals during the third interval. It is also preferred that the switching device allows the capacitor to partially or fully recharge, as required, during the first or third intervals. More preferably, the switching device is a voltage regulator. In other embodiments the capacitive device is connected directly to the terminals and therefore is capable of discharging and charging during the first, second and third periods in dependence with the voltage across those terminals and the state of charge of the capacitive device.

According to a second aspect of the invention there is provided a method for providing power supply to an electrical load, the method including the steps of:

releaseably electrically connecting first terminals extending from the load with a first energy storage device during a first interval and a second energy storage device during a second interval spaced apart from the first interval for allowing power to be supplied to the load during those intervals; and supplying power to the load during a third interval that spans the spacing between the first and the second intervals with a capacitive energy storage device.

According to a third aspect of the invention there is provided a portable electrical device including:

a housing for an electrical load;

a supply rail disposed within the housing for allowing power to be supplied to the load;

a port in the housing for removeably receiving at least a portion of a battery having two or more battery terminals, wherein the battery terminals electrically connect with the supply rail such that the battery provides power to the load; and a capacitive energy storage device located within the housing for providing power to the load when the supply terminals are electrically disconnected from the supply rail.

Preferably, the battery and the capacitive device are connected in parallel. More preferably, the battery is moveable between a nested configuration within the housing where the battery terminals are electrically connected with the supply rail and a remote configuration where the battery terminals are electrically disconnected with the supply rail. Preferably also, the capacitive device includes a capacitor in series with a switch circuit, the circuit being responsive to the electrical disconnection of the battery terminals and the supply rail for allowing the capacitor to provide power to the load. More preferably, the circuit is also responsive to the electrical connection of the battery terminals and the supply rail for preventing the capacitor from providing power to the load. More preferably, the switching device is a voltage regulator. In other embodiments the capacitive device is connected directly to the terminals and therefore is capable of discharging and charging during the first, second and third periods in dependence with the voltage across those terminals and the state of charge of the capacitive device.

According to a fourth aspect of the invention there is provided a method of producing a portable electrical device including:

providing a housing for an electrical load;

disposing a supply rail within the housing for allowing power to be supplied to the load;

removeably receiving within a port in the housing at least a portion of a battery having two battery terminals, wherein the battery terminals electrically connect with the supply rail such that the battery provides power to the load; and locating a capacitive energy storage device within the housing for providing power to the load when the supply terminals are electrically disconnected from the supply rail.

BRIEF DESCRIPTION OF THE DRAWINGS

Preferred embodiments of the invention will now be described, by way of example only, with reference to the accompanying drawings and tables in which.

Table 1 provides some examples of supercapacitors used in preferred embodiments of the invention;

Table 2 provides details of the voltage decay of some of the supercapacitors from Table 1 and illustrates the maximum supply time for the constraints of the given load;

Table 3 illustrates the maximum supply time for the single-cell supercapacitor of Table 1 based upon the constraints of the given load; and Table 4 provides some characteristics of two supercapacitors that are used in two embodiments of the invention.

DESCRIPTION OF THE PREFERRED EMBODIMENTS

The following terms are used in the specification in the following manner:

1. "laptop computer" and "notebook computer" are used interchangeably and are intended to include portable computing devices, particularly those having on board rechargeable energy storage devices;

2. "supercapacitor" is used to designate an energy storage device that stores energy in the electric fields established at the interface between an electrolyte and a plurality of electrodes; and 3. "battery" is used to designate an energy storage device that stores energy electrochemically.

Figure 1:
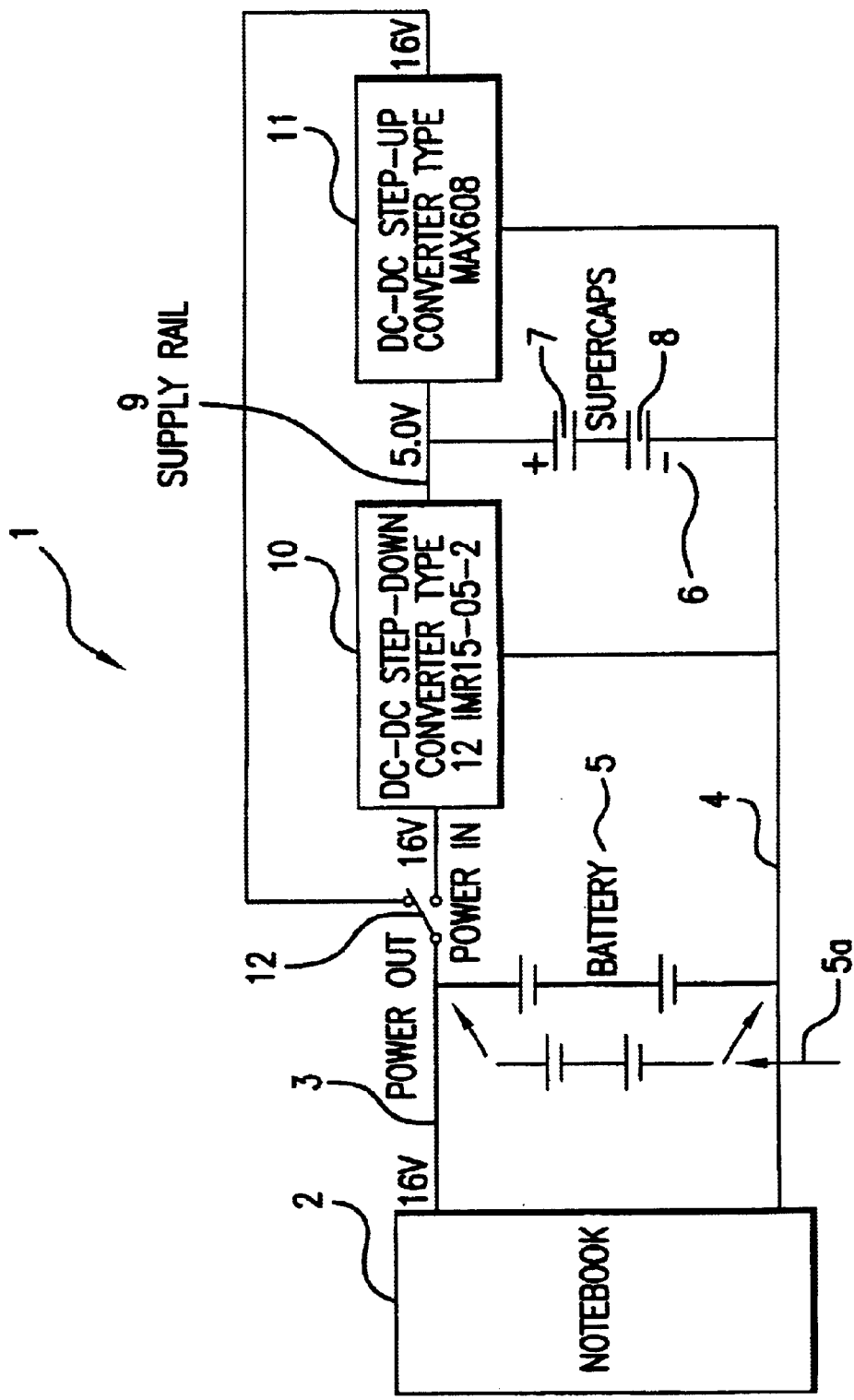
FIG. 1 is a schematic view of a power supply according to the invention.

Referring to FIG. 1 there is illustrated a power supply 1 for an electrical load in the form of a Notebook computer 2. Power supply 1 includes first terminals 3 and 4 which extend from computer 2 for releaseably electrically connecting with a first energy storage device, in the form of battery 5, during a first interval. A second energy storage device, in the form a second battery 5a, releaseably electrically connects with terminals 3 and 4 during a second interval spaced apart from the first interval. This allows power to be supplied to the load during those intervals. A capacitive energy storage device, designated generally by reference numeral 6, supplies power to the load during a third interval that spans the spacing between the first and the second intervals.

Device 6 includes a variety of components, the basis of which are two carbon double layer supercapacitors 7 and 8 which are placed in series and linked to a 5 Volt supply rail 9. In this embodiment supercapacitors 7 and 8 are those developed by the present applicant and designated by the model number 1001PC01. These supercapacitors provide 100 Farads at 2.5 Volts and have an equivalent series resistance of 7.5 m$\Omega$.

In the configuration shown, supercapacitors 7 and 8 store the required energy to run computer 2 for 60 seconds in the sleep mode. As the time for swapping the batteries is usually less than twenty seconds, the configuration illustrated facilitates "hot-swapping" of the first and second battery.

Supercapacitors 7 and 8 are prismatic, being 120 mm wide, 285 mm long and 0.85 mm thick and have copper terminals suitable for soldering.

The power consumption of computer 2 during the sleep mode is equal to 4.8 watts (at 16 Volts and 0.3 Amps).

Use is made of a standard step-down DC-DC converter 10 to charge supercapacitors 7 and 8 during the first and third intervals. Converter 10 is a type 12 IMR 15-05-2 (MELCHER) and has an output current limit of 2.0 Amps, input voltage range from 9 to 18 Volts, and an output voltage of 5.00 Volts at a maximum output power of 10 Watts. The input of converter 10 was connected to battery 5, and the output was connected to the supercapacitors.

During the charging of the supercapacitors, the maximum current taken from battery 5 is 1.2 Amp. The time taken to recharge the flat (fully discharged) supercapacitors to 5.00 Volts is 90 seconds.

Use is also made of a step-up DC-DC converter 11. In this embodiment converter 11 is a MAX608 MAXIM IC and allows the 5.00 Volt rail provided by the supercapacitors to be stepped-up to 16 Volts and provided across terminals 3 and 4 in, the absence of battery 5. The output voltage from converter 11 was connected through a switch 12 back to the battery as shown.

Converter 11 has 10 Watt output with a maximum current of 1.5 Amp, and can deliver and maintain the maximum power with a minimum voltage of 3.0 Volts at the input. Note that the switch should be changed to the "Power Out" position before swapping the batteries, otherwise computer 2 will partially be powered from supercapacitors 7 and 8, which will result in discharging the supercapacitors. Notwithstanding, this situation will resolve itself once the fresh battery is connected and the switch reverted to the "Power In" mode.

To assist the addressee in understanding the invention itself and the advantages that arise, some additional "conceptual level" description follows.

Figure 2:
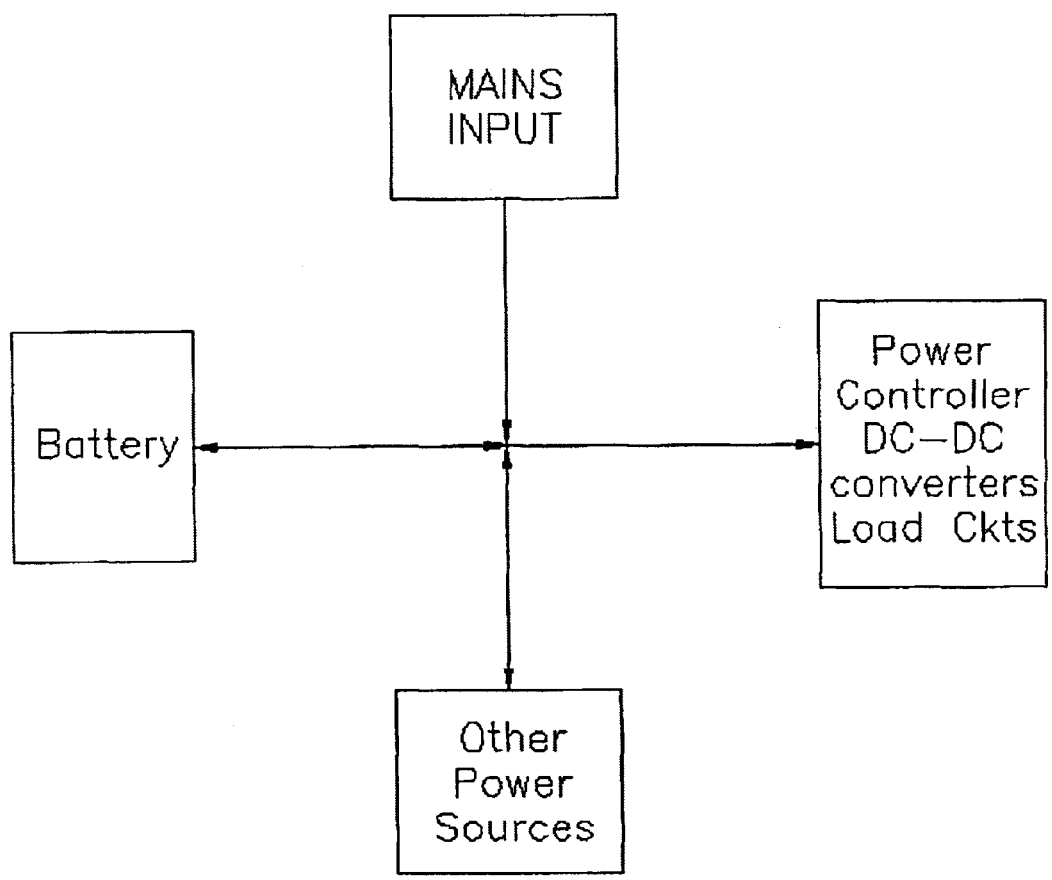
FIG. 2 is a schematic representation of the energy sources of a portable electronic device.

More particularly, as shown in FIG. 2, a portable electrically powered device is configured to running from more than one source of energy. In this case, a battery is the primary source of power for the operation of the device in the absence of mains power.

Clearly, any battery stores only a finite quantum of energy, and this will ultimately be consumed if the device is operated for a long enough period. Where it is expected that this will be the case, additional batteries are relied upon to replace the original battery, once spent.

The replacement of the battery during operation in such a way that it is not necessary to shut down or re-start the device is referred to as a hot swap of the battery. That is, the device keeps operating during the replacement process. Some devices, such as laptop computers, are capable of being placed in a low-power-consumption state prior to swapping the battery, reducing the required capacity of the temporary energy source that supplies the device in the intervening period. The state change from normal to low power consumption is, for some laptops, initiated automatically while, in others, is initiated by the user.

The technique of maintaining the device in a non-active state during the battery swap is sometimes distinguished from a hot swap by the name "warm swap". In general, the information presented here in relation to a hot swap also applies to a warm swap, excepting that in some embodiments reliance is placed upon some human intervention prior to performing a warm swap. Additionally, the quantity of energy required from the alternative energy source during the swap is usually less than that required for a hot swap. Thus, a warm swap usually requires a much smaller alternative energy source than for a hot swap.

Where reference is made to a "DC-DC converter" or a "converter", this is intended to generally indicate a regulator device that is capable of changing a first DC voltage to another DC voltage that is higher or lower than the first voltage. These devices include those instances in which a "linear regulator" is used to reduce a voltage from a higher value to a lower value.

Moreover, where reference is made to the term "battery", this is intended to generally indicate a device that, in addition to a cell or cells that store energy, a device that contain its own protection, control and/or charge-control circuits. Such circuits are used for more complex supply arrangements, such as notebook computer batteries. Such batteries are typically configured to respond to external demand in specific ways, such as by shutting off their output if the load current becomes too large. Some also include the capability of communicating with the devices in the application circuit, exchanging information relating to the state-of-charge, for example.

As will be appreciated from the teaching herein, a supercapacitor is used to provide hot swap support power to a laptop computer. However, other embodiments utilise different supercapacitors in devices that have different power system designs. These designs include systems with or without a charger or DC-DC converter to deliver energy to the battery, those with or without a DC-DC converter to provide power to the supercapacitor from either the battery or another source, and those with or without a DC-DC converter drawing energy from the supercapacitor to supply the load.

Figure 3:
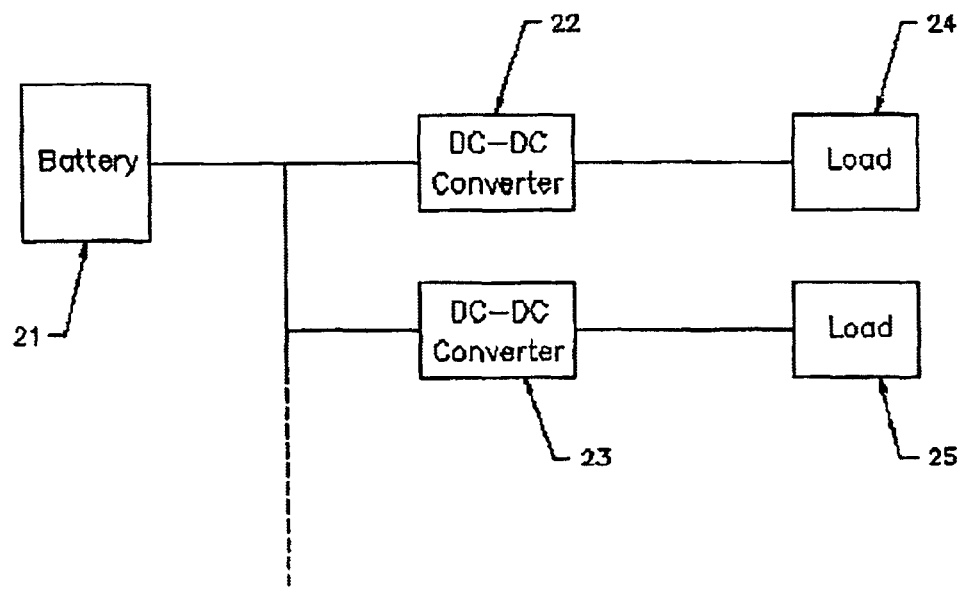
FIG. 3 is a schematic representation of a primary battery and the loads within the portable device that are supplied with energy from the battery.

As best shown in FIG. 3, a typical system configuration consists of a battery 21, some form of DC-DC converter circuits 22 and 23 and the loads 24 and 25. While the illustration in FIG. 2 specifically illustrates multiple converters and loads, such as those that exist in portable computing devices, in other embodiments use is made of a single converter that supplies one or more loads.

Figure 4:
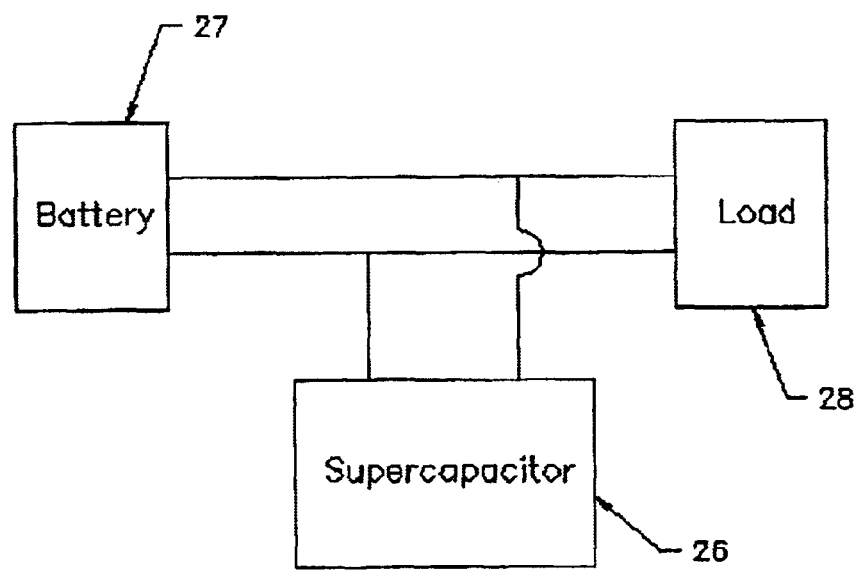
FIG. 4 is a schematic representation of another power supply according to the invention including a supercapacitor directly in parallel with the battery.

Reference is now made to FIG. 4 where there is illustrated a block diagram of the connection of a supercapacitor 26 in parallel with a battery 27 and a load 28. In embodiments where use is made of a converter, the supercapacitor is connected in parallel with the battery and the converter. In other embodiments, however, the supercapacitor is connected in parallel with a converter which, in turn, is connected in parallel with the load. For example, reference is made to FIG. 5 where supercapacitor 31 is connected directly to a converter 32 that, in turn, supplies load 33 once battery 34 is removed. By this means, it is possible to extract more energy from supercapacitor 31 than would otherwise be possible, since converter 32 is designed for operating down to a much lower voltage than the voltage at which load 33 can operate.

Figure 5:
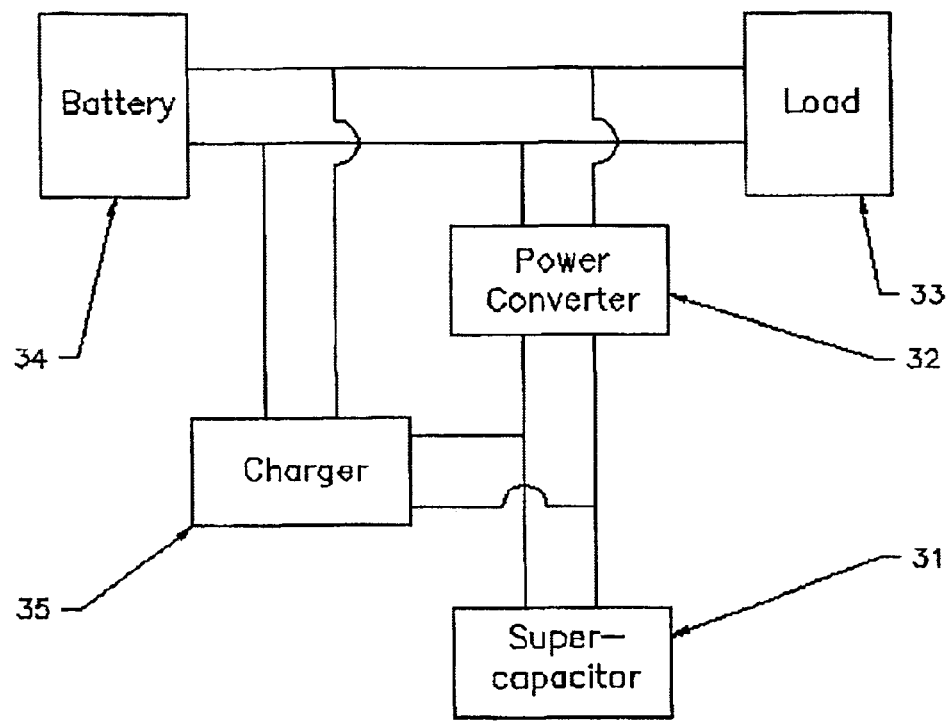
FIG. 5 is a schematic representation of a further power supply according to the invention including a supercapacitor being connected to the load via a dedicated power converter.

Additionally, the arrangement of FIG. 5 buffers supercapacitor 31 from both battery 34 and load 33 through the use of a charger 35 and converter 32. Accordingly, when a fresh battery replaces battery 34 the current flows between the battery and supercapacitor are limited. In some embodiments, charger 35 only operates to recharge supercapacitor 31 once load 33 is being supplied by mains power. That is, the energy stored in the battery is not used to charge the supercapacitor but, rather, to supply to load 33.

Figure 6:
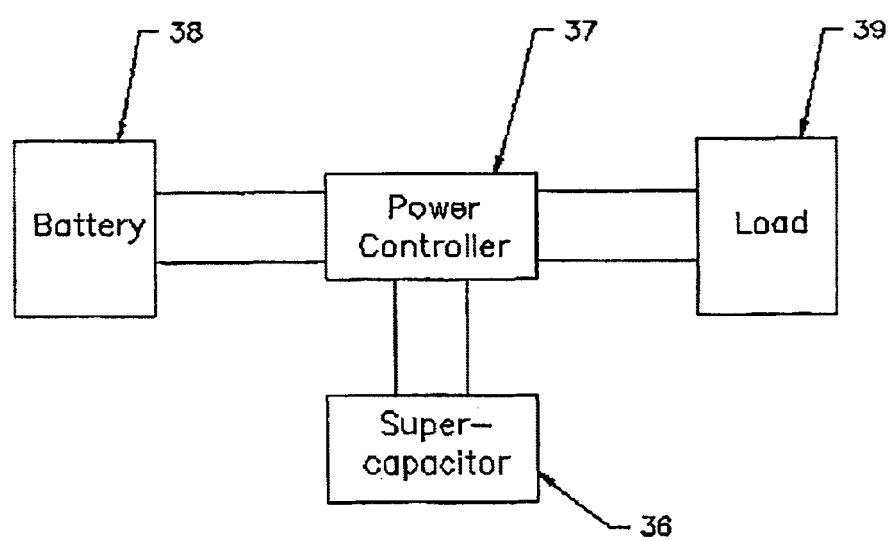
FIG. 6 is a schematic representation of a still further power supply according to the invention including a supercapacitor being connected to the load via a power controller that manages all the power sources for the portable device.

Another embodiment of the invention, as best shown in FIG. 6, make use of a designed-in supercapacitor 36 and an integrated power-control and voltage-converter circuit 37. This allows both the complexity and cost of the circuitry to be reduced over the embodiment illustrated in FIG. 5. That is, circuit 37 includes inputs from a battery 38, supercapacitor 36 and a mains connection (not shown). The output of circuit 37 is connected to a load 39. Circuit 37 is configured to select from the available inputs to transfer energy, as required. For example, when the mains connection is active, circuit 37, is some instances, recharges both battery 38 and supercapacitor 36, while simultaneously providing power to load 39.

Although supercapacitor 36 is illustrated as single component, in other embodiments it includes a plurality of supercapacitors connected in series and/or parallel.

The embodiment of FIG. 6 also makes use of the low ESR characteristics of supercapacitor 36. For example, in cases where load 39 is a notebook computer there are short periods of above average power consumption such as when a drive, such as a disk drive, is actuated or at start up. Circuit 37 is configured such that at these times energy is selectively drawn from both supercapacitor 36 and battery 38, to limit the current drawn from the latter. That is, the characteristics of batteries are best suited to steady state discharge and are least suited to peak discharges. Supercapacitors of the type used in the present embodiments are well suited to peak discharges due to the high capacitance and low ESR's that they exhibit. Accordingly, circuit 3 draws up to a predetermined current from battery 38. If load 39 demands more than that predetermined current, the difference is drawn from supercapacitor 36. The design of battery 38 is such that the predetermined current is only exceeded in reasonable rare circumstances and for short durations.

In some embodiments, circuit 37 only draws the additional current from supercapacitor 36 as the voltage across the terminals of the supercapacitor is greater than a predetermined voltage. This prevents supercapacitor 36 from being depleted to such an extent that it would not be able to provide a usefully long time to allow a battery hot swap.

In some embodiments, load 39 is a notebook computer that includes a run mode having a first average power consumption and a standby or sleep mode which has a second average power consumption. The first average is greater than the second average as in the first mode the computer is fully operational, while in the second mode it is essentially only the memory and certain other circuits that remain powered. To ensure that the "swap time" provided by the supercapacitor is maximised, it is strongly preferred that the computer is placed in standby mode during the interval in which the hot swap occurs. This also applies to electronic devices other than laptop computers. Additionally, in this embodiment, the computer is responsive to the attempted removal of the battery currently being used to progress into the standby mode. This is to safeguard the user against inadvertence or ignorance. In other embodiments, the computer includes a mechanical locking device for preventing or at least obstructing the removal of the battery currently being used until the computer is placed in the standby mode.

Figure 7:
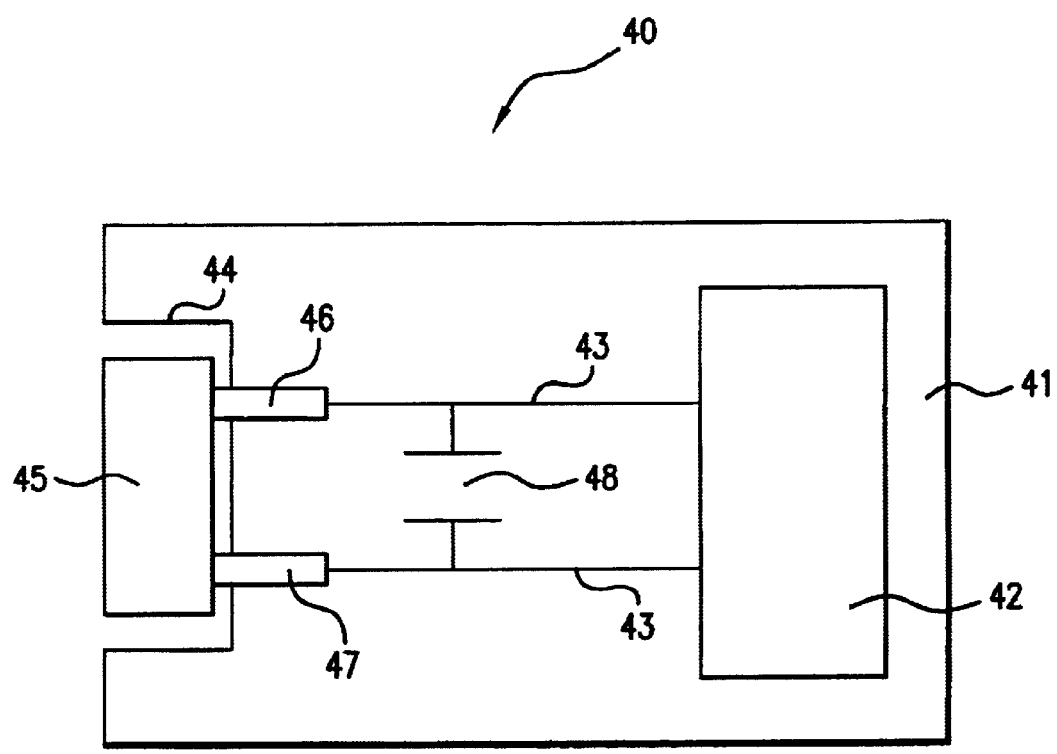
FIG. 7 is a schematic representation of a further power supply according to the invention.

Notebook computers generally include a housing made of two hingedly connected portions that move between a closed and an open configuration. One of the portions houses the motherboard and the associated circuitry, the various ports, the battery and the keyboard and other input devices. The other portion usually houses the VDU. One embodiment of the invention as applied to a portable electrical device, such as a notebook computer 40, is shown in FIG. 7. The notebook computer 40 includes a housing, in the form of a case 41 to which a load, in this instance, electrical circuitry 42 is mounted. A supply rail 43 is disposed within the case 41 for allowing power to be supplied to the electrical circuitry 42. A port 44 in the case 41 removably receives a battery 45. The battery has two battery terminals 46 and 47 that electrically connect with the supply rail 43 to provide cower to the electrical circuitry 42. A capacitive energy storage device in the form of supercapacitor 48 is located within the case 41 for providing power to the electrical circuitry 42 when the battery terminals 46 are electrically disconnected from the supply rail 43. In some embodiments of the invention, as applied to such computers, the supercapacitor is constructed as a flexible sheet like device that is mounted within one of the portions of the housing. An example of such a supercapacitor is the one-cell device referred to in Table 1. More particularly, a supercapacitor of this kind is contained within a package that has a length and a breath dimension approximately equal to the internal dimensions of the portion and is laid flat within that portion. As such a supercapacitor has a thickness of less than 1 mm and it is easily contained within existing housings without the need for redesign. Moreover, even if the length and breadth dimensions are larger than the portion of the housing this need not be problematic, as the supercapacitor is able to be folded within the housing and about other components, as required. Clearly, regard must be had to heat dissipation and engagement between relatively movable components that may cause wear and ultimately puncture of the supercapacitor packaging.

In those systems, such as that illustrated in FIG. 4, in which supercapacitor 26 is directly in parallel with battery 27, load 28 will continue to operate, when battery 27 is removed, until the voltage on supercapacitor 26 drops below the level at which load 28 functions. This voltage is entirely dependant on the design of load 28 and/or any voltage converters of which it makes use.

For the embodiments of the invention depicted in FIGS. 5 and 6, converter 32 and controller 36 are designed specifically to operate across a wide range of supercapacitor voltages, including voltages as low as 0.8 Volts. In other embodiments, converter 32 and controller 36 operate at even lower supercapacitor voltages. This allows the relevant load to operate for a longer period than would be the case for a load that cut out at a higher voltage. It also enables the load to make use of most of the energy stored in the supercapacitor. This allows, for a given run-time, the use of a supercapacitor having a smaller capacitance than would otherwise be the case and, hence, a supercapacitor having a smaller physical size. In the arena of portable electronic devices this is a many fold benefit, as the mass and volume of the device as a whole are critical performance and marketing issues.

The battery hot swap function provided by the preferred embodiments of the invention are effected by using an alternative energy source—a supercapacitor in this case—to power a load or loads while a nearly depleted battery is removed and subsequently replaced with a fresh battery. Owing to the relatively limited storage capacity of a supercapacitor, compared with that of the battery, the duration of operation while using the supercapacitor as a power source is itself usually limited.

In the FIG. 3 arrangement, removal of the battery results in the shut-down of the loads. In the FIG. 4 embodiment, the removal of battery 28 immediately results in current being drawn from supercapacitor 26. During the discharge of supercapacitor 26, the voltage at the terminals of that device drops at a rate determined by the magnitude of the load current and capacitance of the supercapacitor. This is represented by the following equation:

$$dv/dt = C.i \qquad \text{Equation 1}$$

where $dv/dt$ is the time rate of change of the supercapacitor voltage at an instant, C is the supercapacitor's capacitance and i is the current flowing at the time. ($dv/dt$ and i may be defined as negative quantities, when the supercapacitor is being discharged.)

If the fresh battery is not inserted before the voltage drops to the level at which the load ceases to function, the electronic device as a whole will stop operating. Another issue with the architecture of FIG. 3 is that, when the fresh battery is inserted, if the supercapacitor is not at the same voltage, a large current is drawn by the supercapacitor as is charges from the battery. The preferred embodiments of the invention making use of the architecture of FIG. 3 are designed to take account of these current flows and to ensure that the battery and other components are such as not to be damaged during the hot or warm swap.

The maximum duration of the hot-swap time is determined from the initial and final voltages and the current or power drawn by the load. The preferred embodiments make use of supercapacitors that have an ESR that is small in comparison to the internal resistance of the battery. Accordingly to calculate the maximum duration of the hot swap time, use is made of one of the two following equations:

$$t=C(V1-V2)/I \qquad \text{Equation 2}$$

where:
t is the maximum duration of the hot-swap time, in seconds;
C is the capacitance of the supercapacitor;
V1 and V2 are the initial and final voltages at the terminals of the supercapacitor, respectively, in volts; and
i is the current in amps—which is assumed to be constant.
Alternatively, use is made of the following equation:

$$t=0.5C(V1-V2)/P \qquad \text{Equation 3}$$

where:
t is the maximum duration of the hot-swap time, in seconds;
C is the capacitance of the supercapacitor;
V1 and V2 are the initial and final voltages at the terminals of the supercapacitor, respectively, in volts; and
P is the power drawn by the load, in Watts (either the average value, or assumed constant).

Equation 2 is used for those loads that draw substantially constant-current loads, in which the power drawn would change as the voltage on the capacitor dropped. The other equation, Equation 3, is used for those loads requiring constant-power, in which the current would increase as the voltage on the capacitor dropped.

The primary function of the supercapacitors used in the preferred embodiments of the invention is to store energy and deliver it to the system as and when required. When the battery is removed from the system, the supercapacitor supplies energy until:

The energy in the supercapacitor is depleted;
The voltage of the supercapacitor is too low for the system to run; or
A fresh battery is provided to supply the needs of the load.

Table 1 illustrates some examples of supercapacitors that have been manufactured by the applicant for hot swap applications.

For the benefit of the addressee, it is mentioned that the ESR is the Equivalent Series Resistance of the supercapacitor. This is a resistance made up of the interconnection resistances and internal resistances of the supercapacitor. In general, the lower this quantity, the better the supercapacitor for hot swap applications. However, there are some loads that demand very little current flow, with the result that the ESR need not be very low to still gain satisfactory run-times between the swap of batteries.

The last supercapacitor referred to in Table 1 is a one-cell supercapacitor. An advantage of a one-cell supercapacitor is that it is smaller than a multi-cell device for a given capacitance. It usually also provides a lower ESR for its size, because the ESR of a multi-cell device is the sum of the ESRs of its components. This advantage has to be weighed against the advantage of the multi-cell supercapacitors that offer higher supply voltages. However, with the use of an appropriate DC-DC converter to generate the higher voltage for the load, the one-cell supercapacitor is widely applicable.

Table 2 contains run-times for some of the supercapacitors of Table 1, showing how their voltages declined under a given load. In this case, the load is a notebook PC that had been placed in a suspend mode and which drew 1.4 Watts of relatively constant power. While the cut-off voltage at which the PC shut down was actually about 4.05 Volts, the lower limit for design purposes was defined as 5.4V. The PC ran for between 1 and 2 minutes before reaching this design voltage, depending on the supercapacitor used. Where the design limits are permitted to run closer in accordance with the actual cut-off voltage, the hold-up time for the supercapacitors of Table 2 is between 4 minutes 49 seconds and 6 minutes 56 seconds. In other embodiments use is made of larger supercapacitors that extend this time even more so.

The 24 Farad, 12 m$\Omega$, one-cell "hot swap" device of Table 1 is able to maintain a load of 1 W continuously for just over 55.5 seconds, starting at 2.3 Volts and terminating at 0.8 Volts. This data is reflected in Table 3.

The time taken to effect a hot swap of a battery is usually as little as ten seconds. However, the preferred embodiments have included a considerable safety margin to account for operator error and misadventure.

The supercapacitors used in the preferred embodiments of the invention utilise one of a variety of packaging types, depending upon their desired application. By way of example, in some embodiments the supercapacitors are stacked together within a prismatic package having an external plastics housing that is selectively received within a port of a PC. In some cases, that port is normally occupied by a disk drive that is removed to allow connection of the supercapacitors in preparation of a hot swap. In other embodiments the plastics housing is configured as a stand alone unit that includes a receptacle for receiving the mains plug of the PC, again so that the supercapacitors can be electrically connected to the PC in preparation for a hot swap. In still further embodiments, the prismatic supercapacitors are fixedly mounted within the housing of the PC.

In other embodiments, and as discussed above, use is made of supercapacitors having flexible packaging, where those supercapacitors are mounted within the housing of the PC. More preferably, the supercapacitor as a whole is flexible to allow ease of packing within the PC housing.

While the location of the supercapacitor or supercapacitors is not critical, it, or they, are best placed close to the current path between the battery and its load. If high currents flow in the supercapacitor then thick conductors are used for all interconnections.

Provided that good connections are made between the terminals and the adjacent circuitry, the terminal design should not affect the overall operation of the preferred embodiments. This allows the preferred embodiments to be adapted to suit the demands of an OEM who generally prefer something that is easily connected to the existing circuitry. Solderable terminals are frequently preferred and are within the scope of the preferred embodiments, as are flat terminals that are welded ultrasonically to the desired contact points.

The supercapacitors in Table 1 referred to as Mks 1 to Mks 4, have very large, flat terminals of either gold-plated aluminium or sterling silver. This was done to minimise the total series resistance, mainly for the benefit of the battery-life extension aspect of the invention. In other embodiments, however, where the maximum run-time is not so critical— say for a load that draws significantly less average power— use is made of simple flat aluminium terminals. The latter are also far less expensive to produce.

The supercapacitors that are used in the preferred embodiments are of the electric double layer kind having aluminium electrodes including respective carbon coatings that sandwich an intermediate separator. Also include is an electrolyte for allowing ionic conduction between the electrodes. Supercapacitors of this kind are disclosed in PCT application no. PCT/AU99/01081, the disclosure of which is incorporated herein by way of cross reference.

In some embodiments of the invention the supercapacitor as part of the power supply for a notebook computer, and this combination also allows the run-time of the battery to be extended. This functionality is more filly explored in the co-pending PCT application filed with the Australian Patent Office on May 15, 2001 in the name of Energy Storage Systems Pty Ltd and which is numbered PCT/AU/01 . . . The disclosure in that co-pending application is incorporated herein by way of cross reference.

While portable computing devices have increased the productivity of mobile workers, these devices are also disadvantageous in that they require a portable energy source, usually in the form of a battery. With the ever-increasing demands for computing speed and performance, the need for increased energy and power has more than kept pace with the developments in battery technology. Consequently, as all notebook computer users know, it was not possible before now to run a notebook computer for a whole day or a long flight without a change of battery. This involves having to stop work, place the system in suspend-to-disk mode, replace the battery and wake up the system, at a cost of several minutes of productive time. However, with the use of the invention, notebook OEMs have a means to extend the battery run-time of their products and make battery changes quick and simple tasks. Moreover, the latter is achieved without the need to shut the computer down. This is achieved through the combination of a battery and a supercapacitor with relatively high energy-density that is capable of delivering very high power.

Battery designs have advanced mainly in the direction of increasing energy-density in an attempt to maximise the available energy that is contained within a given volume in which the battery is to be stored. In theory, this will accommodate the increasing demands of users of notebook computers and other portable devices for extended battery life. However, a battery's ability to supply high power is strongly dependent on its internal resistance which, in turn, is difficult to reduce when the primary design direction is higher energy density. The internal resistance affects the efficiency and operation of the DC-DC converters that are contained in notebook PCs. Moreover, the protection circuits used in Lithium ion battery packs further increase the effective internal resistance of the battery. A high-power supercapacitor, such as those used in the preferred embodiments, has a very low ESR. The use of such a device in conjunction with a battery results in a hybrid with the combined attributes of high energy and low source impedance.

When it is necessary to change a depleted battery, the old battery is removed, and the supercapacitor supplies the mobile system with its energy needs for over 60 seconds before being depleted. This is more than sufficient time to insert the fresh battery without losing data.

In tests, the available hot swap time was actually 1 to 2 minutes or more. This was observed with a notebook computer in suspend mode, in which its power consumption was 1.4 Watts. The supercapacitors used were 40 Farad and 50 Farad devices. The starting supercap voltage was 6 Volts and the terminating voltage was 5.4 Vots. In fact, the system's DC-DC converters would continue to run to a lower voltage than this, giving a wide margin for error, and the supercapacitors supported the system for about 5 to 7 minutes, depending upon the configuration, before actual shut-down occurred.

The above embodiment uses a supercapacitor at full battery voltage to deliver the hot-swap power. Using a lower-voltage supercapacitor it is possible to achieve the same hot-swap hold-up time with a smaller capacitance supercapacitor. This allows a cost savings to be achieved, as required. The supercapacitor is charged from the battery by a small, low-power buck DC-DC converter, and it delivers power to the system via a second small, low-power boost converter.

Two supercapacitors that have been incorporated into preferred embodiments of the invention are set out in Table 4.

Although the invention has been described with reference to specific examples it will be appreciated by those skilled in the art that it may be embodied in many other forms.

What is claimed is:

1. A power supply for an electrical load, the power supply including:
   first terminals extending from the load for releaseably electrically connecting with a first energy storage device during a first interval and a second energy storage device during a second interval spaced apart from the first interval for allowing power to be supplied to the load during those intervals; and
   a capacitive energy storage device for supplying power to the load during a third interval that spans the spacing between the first and the second intervals.

2. A power supply according to claim 1 wherein the third interval overlaps with one or both of the first and second intervals.

3. A power supply according to claim 1 wherein the first and the second energy storage devices are first and second batteries.

4. A power supply according to claim 1 wherein the first and the second energy storage devices are fuel cells.

5. A power supply according to claim 1 wherein the load is a portable computer and the batteries are rechargeable and are the primary source of power for the computer.

6. A power supply according to claim 5 wherein the computer includes a run mode which has a first average power consumption and a standby or sleep mode which has a second average power consumption, where the first average is greater than the second average and the computer is placed in standby mode during the third interval.

7. A power supply according to claim 6 wherein the computer is responsive to the attempted removal of the battery currently being used to progress into the standby mode.

8. A power supply according to claim 6 wherein the computer mechanically obstructs removal of the battery currently being used until the computer is in standby mode.

9. A power supply according to claim 1 wherein the capacitive energy storage device includes at least one supercapacitor.

10. A power supply according to claim 9 wherein the supercapacitor is a carbon double layer superapacitor.

11. A power supply according to claim 10 including a switching device for allowing the supercapacitor to discharge through the terminals during the third interval.

12. A power supply according to claim 11 wherein the switching device allows the supercapacitor to partially or fully recharge, as required, during the first or second intervals.

13. A method for providing power supply to an electrical load, the method including the steps of:

releaseably electrically connecting first terminals extending from the load with a first energy storage device during a first interval and a second energy storage device during a second interval spaced apart from the first interval for allowing power to be supplied to the load during those intervals; and supplying power to the load during a third interval that spans the spacing between the first and the second intervals with a capacitive energy storage device.

14. A portable electrical device including:

a housing for an electrical load;

a supply rail disposed within the housing for allowing power to be supplied to the load;

a port in the housing for removeably receiving at least a portion of a battery having two battery terminals, wherein the battery terminals electrically connect with the supply rail such that the battery provides power to the load; and a capacitive energy storage device located within the housing for providing power to the load when the supply terminals are electrically disconnected from the supply rail.

15. A device according to claim 14 wherein the battery and the capacitive device are connected in parallel.

16. A device according to claim 14 wherein the battery is moveable between a nested configuration within the housing where the battery terminals are electrically connected with the supply rail and a remote configuration where the battery terminals are electrically disconnected with the supply rail.

17. A device according to claim 16 wherein the capacitive device includes a supercapacitor in series with a switch circuit, the circuit being responsive to the electrical disconnection of the battery terminals and the supply rail for allowing the supercapacitor to provide power to the load.

18. A device according to claim 17 wherein the circuit is also responsive to the electrical connection of the battery terminals and the supply rail for preventing the capacitor from providing power to the load.

19. A method of producing a portable electrical device including:

providing a housing for an electrical load;

disposing a supply rail within the housing for allowing power to be supplied to the load;

removably receiving within a port in the housing at least a portion of a battery having two battery terminals, wherein the battery terminals electrically connect with the supply rail such that the battery provides power to the load; and locating a capacitive energy storage device within the housing for providing power to the load when the supply terminals are electrically disconnected from the supply rail.

20. A power supply for an electrical load having a housing, the power supply including:

first terminals extending from the load for releaseably electrically connecting with a first energy storage device during a first interval and a second energy storage device during a second interval spaced apart from the first interval for allowing power to be supplied to the load during those intervals; and a substantially planar energy storage device located within the housing for supplying power to the load during a third interval that spans the spacing between the first and the second intervals.

21. A power supply according to claim 20 wherein the energy storage device is a supercapacitor.

22. A power supply according to claim 21 wherein the supercapacitor is flexible.

23. A power supply according to claim 21 wherein the load is a portable computer and the housing has two hingedly connected sections and the supercapacitor is mounted in one of the sections.

* * * * *